United States Patent [19]

Kogler

[11] Patent Number: 5,120,365

[45] Date of Patent: Jun. 9, 1992

[54] PIGMENT MIXTURE FOR THE PAPER INDUSTRY CONSISTING OF CALCIUM CARBONATE, DOLOMITE OR MIXTURES THEREOF AND A TALC-KAOLINE MIXTURE

[75] Inventor: Werner Kogler, Olten, Switzerland

[73] Assignee: Pluss-Staufer AG, Switzerland

[21] Appl. No.: 604,345

[22] Filed: Oct. 25, 1990

Related U.S. Application Data

[63] Continuation of Ser. No. 319,533, Mar. 6, 1989, abandoned.

[30] Foreign Application Priority Data

Mar. 7, 1988 [DE] Fed. Rep. of Germany ....... 3807407

[51] Int. Cl.$^5$ ............. C04B 14/00; C04B 14/20; C09B 1/02
[52] U.S. Cl. .................... 106/415; 106/416; 106/417; 106/463; 106/464
[58] Field of Search ............. 106/416, 415, 417, 464, 106/463

[56] References Cited

U.S. PATENT DOCUMENTS

| | | | |
|---|---|---|---|
| 3,940,550 | 2/1976 | Delfosse et al. | 106/464 |
| 4,075,030 | 2/1978 | Bundy et al. | 106/416 |
| 4,279,661 | 7/1981 | Strauch et al. | 106/464 |

FOREIGN PATENT DOCUMENTS 6403280 9/1964 Netherlands ............ 106/464

OTHER PUBLICATIONS

Weigel "Size and character of grains of nonmetalic mineral fillers" *Tech. Paper 296: Dept. of Interior,* 1924, pp. 18–20.

*Primary Examiner*—A. Lionel Clingman
*Assistant Examiner*—John Boyd

[57] ABSTRACT

A new pigment mixture consisting of 40–80% by weight calcium carbonate and/or dolomite and 20–60% by weight talc or 20–60% of a talc-kaolin mixture or 20–60% by weight of a talc-mica mixture gives substantial improvements in the use in the paper industry, in particular in the production of lightweight coated rotogravure papers.

34 Claims, No Drawings

PIGMENT MIXTURE FOR THE PAPER INDUSTRY CONSISTING OF CALCIUM CARBONATE, DOLOMITE OR MIXTURES THEREOF AND A TALC-KAOLINE MIXTURE

This application is a continuation of application Ser. No. 319,533, filed Mar. 6, 1989, now abandoned.

The present application relates to a pigment mixture containing calcium carbonate and the invention further relates to a method for producing said pigment mixture and the preferred use in the paper industry, in particular for coating compositions for rotogravure papers and rotary offset papers, in particular for lightweight coated rotogravure and rotary offset papers (LWC papers).

Coated papers are coated with a composition which contains essentially a binder and a pigment in the form of a mineral filler. A description of the constituents of paper coated materials and their use is to be found for example in the book by James P. Casey "Pulp and Paper Chemistry and Technology", chapter XIX, vol. III (1961).

In printing technology, fundamentally three different methods are known, i.e. letterpress printing, offset printing and rotogravure printing.

Letterpress printing is a socalled relief method. As in the stamp the surface to be printed is elevated in the printing form. By means of a roll the raised image area is inked. In this printing method coating paper is also used which contains kaolin or calcium carbonate.

Offset printing is a socalled planographic method, i.e. the printing and nonprinting parts lie in a plane. They differ in that the printing parts take up and give off fat (i.e. printing ink) but repel water whilst the nonprinting parts retain water but repel fat (ink). The rotating impression cylinder first passes the water-carrying and then the ink-carrying roller. It does not however print directly onto the paper but onto a rubber blanket spanned over the cylinder.

It is only from the latter that the paper takes up the print image on being pressed by means of rollers against the rubber cylinder. In this method both kaolin and calcium carbonate are used as coating pigments.

In rotogravure printing the printing parts of the cylinder lie beneath the polished surface. The cylinder passes firstly through the trough filled with liquid ink and then passes the doctor blade, a steel straight edge, which removes the excess ink whilst the ink intended for printing is retained in cups until the latter are run over by the impression cylinder guiding the paper and the ink thereby sucked out.

For rotogravure printing as coating pigment only kaolin is predominantly used in practice. The use of kaolin as coating pigment in rotogravure papers involves however a number of disadvantages, in particular Poor rheological behaviour; as a result it is not possible to coat with high solid content and this means high energy costs in the coating drying.
Uneconomical because of high costs.
Furthermore, in the prior art socalled "Superclay" is used as coating pigment in rotogravure papers.

Superclay is an English kaolin having a comparatively coarse plate-like structure. Two qualities are available on the market as follows:
Superclay M with about 45% $<2$ $\mu$m particles
Superclay F with about 65% $<2$ $\mu$m particles.

Both qualities are used for rotogravure coating colours in proportions of 50–100% (100% pigment as basis calculation in coating colours) mixed with other kaolins.

The following are considered disadvantages for Superclay:
poor rheological behaviour in highspeed coaters,
higher binder requirement than finer kaolins,
only lower solid contents can be worked,
low gloss development.

The use of talc as coating pigment has already been investigated. In Finland for example talc has been in use in paper making as filler since the sixties. Talc is substantially similar to kaolin in its chemical structure. Kaolin is a plate-like aluminium silicate and talc is a plate-like pigment but is magnesium silicate. The most important physical properties of talc also do not differ appreciably from those of kaolin.

However, talc also has a number of disadvantages when used in paper coating compositions: Due to its chemical structure talc is hydrophobic and this makes the wetting of the pigment surface in dispersions difficult and requires also a good venting in dispersions. Talc also requires a new type of binder and a different procedure in the coater compared with kaolin so that water retention, air content and rheology do not cause any major problems.

Because of these disadvantages attempts have already been made to use a pigment mixture of kaolin and talc in coaters for rotogravure papers and roll offset papers (see Tappi Journal, volume 68, no. 11, November 1985).

For rotogravure papers the mixtures consist of 50 to about 80% talc and 50 to about 20% fine kaolin with 75% $<2\mu$m particle size. For this purpose binders on an acrylate basis are used. In addition there is a wetting agent for talc on the basis of low-foam tensides or polyethylene glycols.

Particular disadvantages of this pigment mixture are:
poor rheological behaviour on highspeed coaters,
can be worked only with relatively low solid content (52% instead of 58%),
the slip and slide properties of the papers in the printing machine are too high and problematical.

It has also been attempted to use calcium carbonate as sole coating pigment in LWC rotogravure papers.

DE-OS P 33 16 949.7 discloses such a coating pigment in the form of calcium carbonate which is characterized in that it is prepared by grinding and/or classification by particle size and comprises
a) 50–70% of particles smaller than 1 $\mu$m,
b) less than 10% of particles smaller than 0.2 $\mu$m and
c) a specific surface area according to BET of less than 10 m$^2$/g.

However this coating pigment has not established itself in practice for use in rotogravure printing because for example the number of missing dots compared with the present invention is greatly increased and the gloss is too low.

In addition, in the literature the expert is even strongly advised not to use calcium carbonate as coating pigment in rotogravure papers on the grounds that poor print results are achieved. Attention is drawn only by way of example below to two publications relating to this aspect.
1. "ECC International", Company magazine, 1981, "How developments in coating pigments affect paper printability" by Dr. Ken Beazley, Research and Development, pages 1 and 2: This publication states literally that one of the "facts of life" is that ground calcium carbonate is a poorer coating pigment for rotogravure papers than kaolin. On page 2 it is again stressed that calcium carbonate gives poor printability.

2. Tappi Coatings Proceedings 1979: "Possibilities and Limitations of High Solids Colours", page 39: Under point 4 "Summary", no. 3, it is stated that the print quality when using ground calcium carbonate is poorer than when using kaolin for the same or for higher solid concentration.

From the "Wochenblatt fuer Papierfabrikation", 107, pages 909 to 914 (1979), no. 23/24, it is already known to use additives of 5–10% talc to calcium carbonate coatings, this being done in offset papers.

Finally, it is likewise known from the Tappi Journal, vol. 68, no. 11, November 1985, to use a mixture of 85% talc and 15% calcium carbonate as pigment mixture.

Grinding and working talc on its own to form slurries is very difficult due to the pronounced hydrophobia of the product. For this reason, simply for better working, to obtain higher solid contents in the slurry 15% $CaCO_3$ has been added to the talc but this was not done for reasons of better coating colours. With regard to paper properties in rotogravure printing this mixture with 85% talc and 15% $CaCO_3$ does not give any advantages over the talc/kaolin mixture. There is even a danger that by the still low solid content in the coating colour (the rheologically positive influence of $CaCO_3$ does not start until additives of about 50% and greater) the paper gloss is reduced. Due to excessive slip and sliding properties of said coating surface the workability is very problematical.

A problem underlying the present invention is to provide a new pigment mixture, in particular a pigment mixture which makes it possible to prepare coating compositions with higher solid content than is possible with pigments or pigment mixtures according to the prior art.

After years of extensive series tests it has now surprisingly been found that contrary to the opinion of those skilled in the art calcium carbonate or a calcium-carbonate-containing pigment, in particular dolomite, can be used under certain conditions to solve the aforementioned problem.

The problem is solved according to the invention in that the pigment mixture contains calcium carbonate and talc at the same time and said pigment mixture is characterized in that it consists of 40–80% by weight calcium carbonate and/or dolomite and 20–60% by weight talc or 20–60% by weight of a talc-kaolin mixture with a proportion of 50–80% by weight talc in said talc-kaolin mixture or 20–60% by weight of a talc-mica mixture with a proportion of 50–80% by weight talc in said talc-mica mixture, the talc having respectively the following grain distribution:

a) 98–100% of particles < 20 μm
b) 25–70% of particles < 2 μm
c) 12–40% of particles < 1 μm
d) 0.1–12% of particles < 0.2 μm in each case of a corresponding spherical diameter.

It has been found that precisely the combination of the aforementioned features according to the invention, i.e. the combination of the pigments used, combined with the quite specific weight percentage compositions and these in turn combined with the quite specific grain distribution of the talc lead to excellent unpredictable good effects in use.

For simplicity, below the three pigments talc and/or kaolin and/or mica will be referred to as "hydrosilicates", simply to avoid these three expressions having to be constantly repeated in the following description.

Advantageous is a pigment mixture of 80% by weight calcium carbonate or dolomite and 20% by weight talc.

Also advantageous are pigment mixtures which consist of 70% by weight calcium carbonate or dolomite and 30% by weight of one or more hydrosilicates or 50–60% by weight calcium carbonate or dolomite and 40–50% by weight of one or more hydrosilicates.

Particularly advantageous are pigment mixtures which consist of 52% by weight calcium carbonate or dolomite and 48% by weight of one or more hydrosilicates.

Also particularly advantageous are pigment mixtures which consist of 53% by weight calcium carbonate or dolomite and 47% by weight of one or more hydrosilicates or 54% by weight calcium carbonate or dolomite and 46% by weight of one or more hydrosilicates.

Furthermore, particularly advantageous are pigment mixtures which consist of 45% by weight calcium carbonate or dolomite and 55% by weight of one or more hydrosilicates or 50% by weight calcium carbonate or dolomite and 50% by weight of one or more hydrosilicates.

Advantageous is a pigment mixture in which the calcium carbonate or the dolomite has the following grain distribution a) 95–100% of particles < 10 μm
b) 60–98% of particles < 2 μm
c) 15–80% of particles < 1 μm
d) 0.1–20% of particles < 0.2 μm in each case of a corresponding spherical diameter.

Furthermore, a pigment mixture is advantageous in which the calcium carbonate or the dolomite has the following grain distribution a) 95–100% of particles < 10 μm
b) 70–96% of particles < 2 μm
c) 20–75% of particles < 1 μm
d) 2–17% of particles < 0.2 μm in each case of a corresponding spherical diameter.

Particularly advantageous is a pigment mixture in which the calcium carbonate or dolomite has the following grain distribution a) 96–100% of particles < 10 μm
b) 80–94% of particles < 2 μm
c) 35–70% of particles < 1 μm
d) 5–15% of particles < 0.2 μm in each case of a corresponding spherical diameter.

Particularly advantageous is a pigment mixture in which the calcium carbonate or dolomite has the following grain distribution a) 97–100% of particles < 10 μm
b) 85–92% of particles < 2 μm
c) 45–65% of particles < 1 μm
d) 7–12% of particles < 0.2 μm in each case of a corresponding spherical diameter.

Extremely excellent results are achieved if the calcium carbonate or the dolomite has the following grain distribution a) 99% of particles < 10 μm
b) 90% of particles < 2 μm
c) 60% of particles < 1 μm
d) 10% of particles < 0.2 μm in each case of a corresponding spherical diameter.

Particularly advantageous is a pigment mixture in which the mica has the following grain distribution a) 98–100% of particles <20 μm
b) 25–70% of particles <2 μm
c) 12–40% of particles <1 μm
d) 0.1–12% of particles <0.2 μm
in each case of a corresponding spherical diameter.

Also particularly advantageous is a pigment mixture in which the talc has the following grain distribution
a) 98–100% of particles <20 μm
b) 40–58% of particles <2 μm
c) 20–34% of particles <1 μm
d) 0.1–5% of particles <0.2 μm
in each case of a corresponding spherical diameter.

Extremely excellent properties are achieved if the talc has the following grain distributions
a) 98% of particles <20 μm
b) 50% of particles <2 μm
c) 25% of particles <1 μm
d) 2% of particles <0.2 μm
in each case of a corresponding spherical diameter.

Also advantageous is a pigment mixture in which the kaolin has the following grain distribution
a) 90–100% of particles <20 μm
b) 20–93% of particles <2 μm
c) 10–60% of particles <1 μm
d) 0.1–10% of particles <0.2 μm
in each case of a corresponding spherical diameter.

Particularly advantageous is a pigment mixture in which the kaolin has the following grain distribution
a) 95–100% of particles <20 μm
b) 55–85% of particles <2 μm
c) 30–54% of particles <1 μm
d) 2–7% of particles <0.2 μm
in each case of a correponding spherical diameter.

Extremely excellent properties are achieved if the kaolin has the following grain distribution
a) 100% of particles <20 μm
b) 80% of particles <2 μm
c) 51% of particles <1 μm
d) 4% of particles <0.2 μm
in each case of a corresponding spherical diameter.

Advantageously, calcium carbonates and dolomites may be used which have a specific surface area according to BET in the range of 3–18 $m^2/g$.

Still better results are achieved if the specific surface area according to BET of the calcium carbonate or the dolomite lies in the range from 6–15 $m^2/g$. Still better results are achieved if the specific surface area according to BET of the calcium carbonate or the dolomite lies in the range from 8–12 $m^2/g$. Excellent properties are achieved if the specific surface area according to BET of the calcium carbonate or the dolomite is 10 $m^2/g$.

Advantageously, hydrosilicates having a specific surface area according to BET in the range 5–16 $m^2/g$ may be used.

Still better results are achieved if the specific surface area according to BET of the hydrosilicate lies in the range from 7–15 $m^2/g$. Still better results are achieved if the surface area according to BET of the hydrosilicate lies in the range from 10–13 $m^2/g$. Excellent properties are achieved if the specific surface area according to BET of the hydrosilicate is 12 $m^2/g$.

Preferable pigment mixtures consisting of three minerals have the following compositions:
50–60% by weight calcium carbonate or calcium-carbonate containing mineral, in particular dolomite,
20–30% by weight talc and
20–30% by weight kaolin
or
50% by weight calcium carbonate or carbonate-containing mineral, in particular dolomite
25% by weight talc and
25% by weight kaolin.

The pigment mixture according to the invention can be used in particular for rotogravure papers. The latter consist essentially of a raw paper web on which the coating is applied by machine. Said coating consists essentially of the pigment mixture according to the invention and water, dispersing agent, wetting agent, binder and auxiliary agent. It is within the ability of the average person skilled in the art to make the rotogravure paper with the aid of the pigment mixture according to the invention together with the other aforementioned constituents. The same applies to the production of other technical products in which the pigment mixture according to the invention can be made, for example for other papers, for example roll offset papers.

Wetting agents, i.e. tensides (low-foam) and polyethylene glycol, are certainly known to the average expert in the paper industry. Such products have been in use in the paper industry for years under tradenames such as Plastigen T (BASF) or PEG 4000, PEG 2000 (HOECHST).

As wetting agents (in particular due to the talc), according to the invention preferably aqueous solutions of low-foam tensides or polyethylene glycols are employed. These wetting agents are known per se to the person skilled in the art.

Preferably 0.5–1.5% by weight wetting agent is employed with respect to the content of hydrosilicate.

As dispersing agent according to the invention preferably aqueous solutions of sodium polyacrylate or $NH_4$-polyacrylate with a solid content of about 40% by weight are used. These dispersing agents are known per se to the expert. Preferably 0.1–0.3% by weight dispersing agent is used with respect to the content of hydrosilicate.

Preferably, in particular when used in rotogravure paper coating compositions, the pigment mixture additionally contains 4–6% by weight binder with respect to the content of the total pigment mixture. Particularly advantageous is an addition of an acrylic-acid-containing copolymer (self-thickening) in an amount of 5% by weight with respect to the content of the total pigment mixture.

Preferably, in particular when used in rotogravure paper coating compositions, the pigment mixture additionally contains 0.1–1.2% by weight sodium or calcium stearate with respect to the content of the total pigment mixture, for example 0.8% by weight calcium stearate or 0.4% by weight sodium stearate.

The pigment mixture according to the invention can preferably be used in a coating composition for the paper industry, in particular for rotogravure paper, said coating composition consisting of 40–80% by weight calcium carbonate or dolomite, 20–60% by weight of one or more hydrosilicates and additionally 4–6% by weight binder with respect to the content of the total pigment, 0.1–0.3% by weight dispersing agent with respect to the content of the hydrosilicate, 0.5–1.5% by weight wetting agent with respect to the content of hydrosilicate, 0.1–1.2% by weight Na or Ca-stearate with respect to the content of the total pigment and an amount of water such that a solid content of 50 to 65% by weight is present.

Furthermore, the pigment mixture according to the invention can advantageously be used in paints and lacquers and in plastics, in particular as filler. The measurement of the specific surface area was according to BET corresponding to DIN 66132. The sample pre-dried at 105° C. until constant weight was heated in the thermostat at 250° C. with nitrogen flushing for one hour. The measurement was with nitrogen ($N_2$) as measuring gas with cooling by liquid nitrogen.

The technical expressions contained in the presently disclosed solution of the problem set will be defined hereinafter using concepts known to those skilled in the art and publications readily accessible to them.

All the fineness features of the products produced according to the invention specified in the present patent application were determined by sedimentation analyses in the gravitational field with the SEDI-GRAPH 5000 of the company Micromeritics, U.S.A.. The average expert is familiar with this apparatus, which is used throughout the world to determine the fineness of fillers and pigments. The measurement was carried out in a 0.1% by weight aqueous $Na_4P_2O_7$ solution. The dispersion of the samples was done by means of highspeed agitators and ultrasound.

The measured particle distribution is represented on the X-Y recorder as permeation summation curve (cf. for example Belger, P., Schweizerische Vereinigung der Lack- und Farben-Chemiker, XVII. FATIPEC-Congress, Lugano, Sep. 23 to 28, 1984), the particle diameter of a corresponding spherical diameter being plotted on the X-axis and the proportion of particles in % by weight on the Y-axis.

The fineness features defined above were read or calculated from the curves obtained with the procedure described above. With regard to the above definintions see also Belger, P., Schweizerische Vereinigung der Lack- und Farben-Chemiker, XVII. FATIPEC-Congress, Lugano, Sep. 23 to 28, 1984).

Hereinafter preferably mixture ratios of calcium carbonate and talc and their respective advantages are shown, the percentages being percent by weight in each case:

| | |
|---|---|
| 80% $CaCO_3$ | good rheology, solid content |
| 20% talc | extremely high (65% by weight); |
| 70% $CaCO_3$ | good rheology, solid content |
| 30% talc | very high (63% by weight), gloss increases, missing dots reduced; |
| 60% $CaCO_3$ | good rheology, gloss increases, |
| 40% talc | high solid content (61% by weight), missing dots further reduced; |
| 50% $CaCO_3$ | gloss increases, good solid content |
| 50% talc | (59% by weight), very few mising dots. |

Talc is a magnesium silicate with substantially the same composition as soapstone, i.e. a phyllosilicate of the formula $Mg_3((OH)_2(Si_4O_{10}))$. It forms transparent to opaque colourless masses with a density of 2.7 and a hardness of 1, which consist of leafy-crystalline, scaley, nacreous, micaceous aggregates.

A typical talc composition as can preferably be employed according to the invention consists of 96-98% by weight 3 $MgO.4SiO_2.H_2O$ and 2-4% by weight $MgCO_3$.

According to the invention kaolin may also be used as hydrosilicate. Kaolin is a generic term for hydrated aluminium silicates (clays) which because of their earlier main use were also called china clays. The main components are the triclinic kaolinite and the monoclinic dickite and nacrite (general formula $Al_2O_3.2SiO_2.2H_2O$ or $Al_4(OH)_8[Si_4O_{10}]$) together with montmorillonite and gel-like luminous silicates (allophanes). Completely pure kaolin, which is obtained by elutriation (in particular washing out of the sand) from crude kaolin, consists almost only of kaolinite with 39.7% $Al_2O_3$, 46.4% $SiO_2$ and 13.9% $H_2O$; it forms a loose friable white mass which becomes plastic with water and consists of microcrystalline aluminium silicate.

According to the invention a great variety of calcium carbonates or calcium-carbonate-containing pigments may be used, in particular natural calcium carbonates in the form of chalk, marble and limestone from a great variety of deposits. Precipitated calcium carbonate may also be used. Within the scope of the invention dolomite can also advantageously be used.

The calcium carbonates used according to the invention and the dolomite used according to the invention are preferably made in that they are first dry ground in a manner known per se and thereafter processed by classification by particle size by means of pneumatic separation or in that they are made by wet grinding in a manner known per se.

The hydrosilicates used according to the invention are preferably made in a manner known per se in that after mining from natural deposits they are processed by classification by particle size by means of hydrocyclones and centrifugation and/or also by delamination means.

The pigment mixture according to the invention can be made by simple mixing of the individual components in a manner known per se.

Fundamentally, there are three possible ways of making a coating composition for paper coating, i.e. the preferred use of the pigment mixture according to the invention:

1. $CaCO_3$, in particular natural $CaCO_3$, or dolomite as powder material is dispersed with hydrosilicate, e.g. talc, possibly also as powder material granulate (with about 10% water) in a mixer. As dispersing agent Na or $NH_4$-polyacrylate is used. The solid of the slurry may be set to about 75% by weight. In the case of talc a wetting agent is used to improve the wetting of the hydrosilicate.
2. $CaCO_3$, in particular natural $CaCO_3$, or dolomite is in the form of a slurry and the hydrosilicate, e.g. talc powder or granulate, is dispersed in said slurry after previous admixture of water for the hydrosilicate, e.g. talc, dispersing agent and wetting agent up to solid contents of at the most 75%.
3. Calcium carbonate, in particular natural calcium carbonate, or dolomite is in the form of a 65-75% slurry and the hydrosilicate, e.g. talc, is likewise in the form of a 65-75% slurry (dispersed with the previously mentioned polyacrylates and wetting agents known per se) and the two pigments are then mixed together by means of mixers and dispersing units and brought to a solid content of about 75% depending on the mixing ratio.

The preparation described under 2 is preferred to that under because the total dispersing work can be considerably reduced and a higher solid content is obtained. The mixing of talc powder or granulate into the $CaCO_3$ slurry is considerably simpler and less time-consuming. This also makes it possible to break down agglomerates in the powder material of the hydrosilicate, in particular talc.

The preparation described under 3 is the most economical and best method of preparation because the entire dispersing work in the paper mill is eliminated.

A requirement preferably to be observed for using the pigment mixtures according to the invention in coating colours is the production of coating raw paper with a pH value of 6.8 to 7.5 (so called "neutral paper production").

Further objectives, features and advantages of the invention will be apparent from the following description with the aid of examples of embodiment (all percentages throughout the description are percentages by weight unless otherwise indicated. "adry" means "absolutely dry"):

Examples of embodiment

EXAMPLE I

| 50% by weight nat. CaCO₃ | 99% < 10 μm |
| | 90% < 2 μm |
| | 60% < 1 μm |
| | 10% < 0.2 μm |
| spec. surface BET: | 10 m²/g |
| White Elrepho R457: | 86% |
| 50% by weight talc (granulate) | 98% < 20 μm |
| | 50% < 2 μm |
| | 25% < 1 μm |
| | 2% < 0.2 μm |
| 0.3% dispersing agent - polyacrylate for talc (adry) e.g. polysalt S | |
| 1.2% wetting agent (trade basis) for talc, e.g. Plastigen T | |
| 5% plastic binder - acrylic acid ester e.g. Acronal S 548 V or Acronal S 538 | |
| 0.8% Ca or Na-stearate e.g. Nopcote C 104 | |
| solid content: | 59% |
| pH: | 9.0 |

EXAMPLE II

| 80% by weight nat. CaCO₃ | 99% < 10 μm |
| | 90% < 2 μm |
| | 60% < 1 μm |
| | 10% < 0.2 μm |
| spec. surface BET: | 10 m²/g |
| White Elrepho R457: | 86% |
| 20% by weight talc (granulate) | 98% < 20 μm |
| | 50% < 2 μm |
| | 25% < 1 μm |
| | 2% < 0.2 μm |
| 0.3% dispersing agent - polyacrylate for talc (adry) e.g. polysalt S | |
| 1.2% wetting agent (trade basis) for talc, e.g. Plastigen T | |
| 5% plastic binder - acrylic acid ester e.g. Acronal S 548 V or Acronal S 538 | |
| 0.8% Ca or Na-stearate e.g. Nopcote C 104 | |
| solid content: | 65% |
| pH: | 9.0 |

EXAMPLE III

| 50% by weight nat. CaCO₃ | 99% < 10 μm |
| | 60% < 2 μm |
| | 20% < 1 μm |
| | 5% < 0.5 μm |
| spec. surface BET | 4 m²/g |
| White Elrepho R 457: | 86% |

All other method steps as in Example I.

EXAMPLE IV

| 80% by weight nat. CaCO₃ | 99% < 10 μm |
| | 60% < 2 μm |
| | 20% < 1 μm |
| | 5% < 0.5 μm |
| specific surface BET | 4 m²/g |
| White Elrepho R 457 | 86% |

All other method steps as in Example II.

EXAMPLE V

| 50% by weight nat. CaCO₃ | 99% < 10 μm |
| | 90% < 2 μm |
| | 60% < 1 μm |
| | 10% < 0.2 μm |
| spec. surface BET: | 10 m²/g |
| White Elrepho R 457: | 86% |
| 25% by weight talc (granulate) | 98% < 20 μm |
| | 50% < 2 μm |
| | 25% < 1 μm |
| | 2% < 0.2 μm |
| 25% by weight kaolin | 100% < 20 μm |
| | 80% < 2 μm |
| | 51% < 1 μm |
| | 4% < 0.2 μm |
| 0.3% dispersing agent - polyacrylate for talc (adry) e.g. polysalt S | |
| 1.2% wetting agent (trade basis) for talc, e.g. Plastigen T | |
| 5% plastic binder - acrylic acid ester e.g. Acronal S 548 V or Acronal S 538 | |
| 0.8% Ca or Na-stearate e.g. Nopcote C 104 | |
| solid content: | 59% |
| pH: | 9.0 |

USE EXAMPLES AND COMPARATIVE EXAMPLES

With the method described above a great number of different pigment mixtures were prepared of which 4 are described below having particularly different mixing ratios.

The examination of these mixture products in coating colours was in a pilot coating apparatus of which the results can be directly applied to practice.

| 1. Mixture recipe: | |
|---|---|
| 100% by weight Superclay M (corresponding to the present state of the art) | |
| 2. Mixture recipe (corresponding to the invention) | |
| 50% by weight nat. CaCO₃ | 99% < 10 μm |
| | 90% < 2 μm |
| | 60% < 1 μm |
| | 10% < 0.2 μm |
| 50% by weight talc | 98% < 20 μm |
| | 50% < 2 μm |
| | 25% < 1 μm |
| | 2% < 0.2 μm |
| 3. Mixture recipe (corresponding to the invention) | |
| 50% by weight nat. CaCO₃ | (as 2) |
| 25% by weight talc | (as 2) |
| 25% by weight kaolin | 98% < 20 μm |
| | 75% < 2 μm |
| | 45% < 1 μm |
| | 12% < 0.2 μm |
| 4. Mixture recipe (corresponding to the invention) | |
| 60% by weight nat. CaCO₃ | (as 2) |
| 20% by weight talc | (as 2) |
| 20% by weight kaolin | (as 3) |

For the 1st mixture recipe the following products, based on 100% by weight total pigment (Superclay M), were used for the coating colour preparation;

| | |
|---|---|
| Binder (acrylic-acid-ester-containing copolymer), self-thickening | 5.0 bw adry |
| Dispersing agent (Na-polyacrylate) | 0.3 bw adry |
| Calcium stearate | 0.8 bw adry |

The solid of the coating colour was set to 52%.

For the mixture recipe 2 the following products were used for the coating preparation, likewise based on 100% by weight total pigment:

| | |
|---|---|
| binder (acrylic-acid-ester-containing copolymer), self-thickening | 5.0 bw adry |
| dispersing agent for talc (Na-polyacrylate) | 0.3 bw adry |
| wetting agent for talc (polyethylene glycol) | 1.2 bw air dry |
| Na-stearate | 0.4 bw adry |

The solid content of the coating colour was set to 59%.

For the mixture recipes 3 and 4 the following products were used for the coating colour preparation, likewise based on 100% by weight total pigment in each case:

| | |
|---|---|
| binder (as 1-3) | 5.0 bw adry |
| dispersing agent for talc (as 2) | 0.3 bw adry |
| wetting agent for talc (as 2) | 1.2 bw air dry |
| dispersing agent for kaolin | 0.3 bw adry |
| sodium stearate | 0.4% bw adry |

The solid content of the coating colours was set to 59%.

In all the aforementioned mixture recipes a $CaCO_3$ slurry already dispersed with Na-polyacrylate with a solid content of 72.5% was used.

| Coating conditions (for all specified coating colours) | |
|---|---|
| coating raw paper: | 35-37 g/m², wood-containing |
| coat application: | T.S. 7 g/m², S.S. 8 g/m² |
| coater: | combi blade coater or inverted blade coater |
| speed: | 1300-1500 m/min. |
| coating drying: | gas infrared radiator 1200° C. + airfoils 300° C. |
| glazing: | supercalender pilot apparatus 400 m/min, 80° C. steel roller temperature. |
| T.S. = top side, S.S. = screen side. | |
| Test conditions | |
| gloss: | according to Tappi in 75° instance and reflection angle |
| opacity: | according to DIN 53 146 |
| laboratory proof print: | |
| printer | "Pruefbau" rotogravure proof printer |
| impression cylinder | engraved |
| printing speed | 5 m/s |
| ink | rotogravure printing ink (black) |

The print quality was assessed visually. A rating order was formulated.
Print gloss:

The gloss measurement was by Tappi in 75° instance and reflection angle on the full surface of the laboratory proof rotogravure print.

Strike-through and show-through:

The laboratory proof rotogravure prints were used.

The reflectance of the coated unprinted paper ($=R$) and reflectance degree of the back of the imprinted full areas ($=Rfr$) are measured. The calculation is by the formula $$\frac{R - Rfr}{R} \cdot 100$$

Practical print tests:

| | |
|---|---|
| printing machine | Wifang Rotomaster |
| impression cylinder | engraved |
| cylinder revolution/h | 15000 |
| colour sequence | yellow, magenta, cyan, black |

All the papers were printed without static printing aid.

The practical print tests were evaluated visually. A rating order was formulated.

| | Test results | | | |
|---|---|---|---|---|
| | Coating recipe no. | | | |
| | 1 | 2 | 3 | 4 |
| paper gloss (calender, laboratory) % | 36/35 | 40/40 | 39/41 | 42/41 |
| Print gloss (practice): % | 70 | 74 | 74 | 76 |
| opacity: % | 89.3 | 90.5 | 90.0 | 90.5 |
| Practice print test rotogravure rating order | 4 | 1 | 2 | 3 |

SUMMARY

Pigment mixtures of $CaCO_3$ or calcium-carbonate-containing pigment and hydrosilicates are disclosed which make it possible to produce coating colours in particular for LWC rotogravure papers which contrary to the opinion prevalent in the art have surprising advantages such as the following:

1. With appreciably higher solid content (prior art: 52-54%; invention: 59-61%) even at extremely high speeds of the coater up to 1500 m/min due to better rheological properties a more favourable less problematical running behaviour at the coating unit is obtained (no doctor blade streaks, no whisker formation on the blade).

2. The test results show for all the mixtures according to the invention better properties as regards gloss, print gloss, opacity and imprintability in rotogravure printing than possible with the present state of the art.

3. Due to the higher solid content (=less energy expenditure in drying and thus higher machine speeds) and low pigment costs altogether the pigment mixtures according to the invention give greater economy for the paper industry.

The invention has in particular the following advantages:

1. Due to the mixing according to the invention, in particular of natural $CaCO_3$ and hydrosilicate, e.g. talc, as described above the running properties on highspeed coaters are improved with conventional kaolin recipes to such an extent that the solid content, depending on the particular coating weight required, can be increased
  a) in the case of LWC rotogravure coatings from 50–55% to 58–65% (coating application 7–12 g/m²/side) and
  b) in the case of LWC roll offset coatings from 54–58% to 58–65% (coating application 7–12 g/m²/side).

2. The solid content increased by the improved running properties of the mixture according to the invention, in particular of CaCO₃ and hydrosilicate, e.g. talc, leads due to less drying work in the coater to an energy saving of 10–30%. Instead of the energy saving or together with said saving it is possible to increase the coater speed and this again increases productivity.

I claim:

1. Pigment mixture for use on paper wherein the mixture consists of 40–80% by weight calcium carbonate or dolomite or mixtures thereof and 20–60% by weight talc or 20–60% by weight of a talc-kaolin mixture with a proportion of 50–80% by weight talc in said talc-kaolin mixture or 20–60% by weight of a talc-mica mixture with a proportion of 50–80% by weight talc in said talc-mica mixture, the talc having respectively the following grain distribution:
  a) 98–100% of particles < 20 μm
  b) 25–70% of particles < 2 μm
  c) 12–40% of particles < 1 μm
  d) 0.1–12% of particles < 0.2 μm
in each case of a corresponding spherical diameter, and wherein the calcium carbonate or the dolomite has the following grain distribution:
  a) 95–100% of particles < 10 μm
  b) 60–98% of particles < 2 μm
  c) 15–80% of particles < 1 μm
  d) 0.1–20% of particles < 0.2 μm
in each case of a corresponding spherical diameter.

2. Pigment mixture according to claim 1, wherein the specific surface area according to BET of the calcium carbonate or the dolomite lies in the range from 3–18 m²/g.

3. Pigment mixture according to claim 1, wherein the specific surface area according to BET of the talc or kaolin or mica lies in the range from 5–16 m²/g.

4. Pigment mixture according to claim 1, wherein the mixture consists of 80% by weight calcium carbonate or dolomite or mixtures thereof and 20% by weight talc.

5. Pigment mixture according to claim 1, wherein the mixture consists of 70% by weight calcium carbonate or dolomite or mixtures thereof and 30% by weight talc of 30% by weight of a talc-kaolin mixture with a proportion of 50–80% by weight talc in said talc-kaolin mixture or 30% by weight of a talc-mica mixture with a proportion of 50–80% by weight talc in said talc-mica mixture, the talc having respectively the following grain distribution:
  a) 98–100% of particles < 20 μm
  b) 25–70% of particles < 2 μm
  c) 12–40% of particles < 1 μm
  d) 0.1–12% of particles < 0.2 μm
in each case of a corresponding spherical diameter.

6. Pigment mixture according to claim 1, wherein the mixture consists of 50–60% by weight calcium carbonate or dolomite or mixtures thereof and 40–50% by weight talc or 40–50% by weight of a talc-kaolin mixture with a proportion of 50–60% by weight in said talc-kaolin mixture or 40–50% by weight of a talc-mica mixture with a proportion of 50–80% by weight talc in said talc-mica mixture, the talc having respectively the following grain distribution:
  a) 98–100% of particles < 20 μm
  b) 25–70% of particles < 2 μm
  c) 12–40% of particles < 1 μm
  d) 0.1–12% of particles < 0.2 μm
in each case of a corresponding spherical diameter.

7. Pigment mixture according to claims 1 or 6, wherein the mixture consists of 52% by weight calcium carbonate dolomite or mixtures thereof and 48% by weight talc of 48% by weight of a talc-kaolin mixture with a proportion of 50–80% by weight talc in said talc-kaolin mixture or 48% by weight of a talc-mica mixture with a proportion of 50–80% by weight talc in said talc-mica mixture, the talc having respectively the following grain distribution:
  a) 98–100% of particles < 20 μm
  b) 25–70% of particles < 2 μm
  c) 12–40% of particles < 1 μm
  d) 0.1–12% of particles < 0.2 μm
in each case of a corresponding spherical diameter.

8. Pigment mixture according to claims 1 or 6, wherein the mixture consists of 53% by weight calcium carbonate or dolomite or mixtures thereof and 47% by weight talc or 47% by weight of a talc-kaolin mixture with a proportion of 50–80% by weight talc in said talc-kaolin mixture or 47% by weight of a talc-mica mixture with a proportion of 50–80% by weight talc in said talc-mica mixture, the talc having respectively the following grain distribution:
  a) 98–100% of particles < 20 μm
  b) 25–70% of particles < 2 μm
  c) 12–40% of particles < 1 μm
  d) 0.1–12% of particles < 0.2 μm
in each case of a corresponding spherical diameter.

9. Pigment mixture according to claims 1 or 6, wherein the mixture consists of 54% by weight calcium carbonate or dolomite or mixtures thereof and 46% by weight talc or 46% by weight of a talc-kaolin mixture with a proportion of 50–80% by weight talc in said talc-kaolin mixture or 46% by weight of a talc-mica mixture with proportion of 50–80% by weight talc in said talc-mica mixture, the talc having respectively the following grain distribution:
  a) 98–100% of particles < 20 μm
  b) 25–70% of particles < 2 μm
  c) 12–40% of particles < 1 μm
  d) 0.1–12% of particles < 0.2 μm
in each case of a corresponding spherical diameter.

10. Pigment mixture according to claims 1 or 6, wherein the mixture consists of 45% by weight calcium carbonate or dolomite or mixtures thereof and 55% by weight talc or 55% by weight of a talc-kaolin mixture with a proportion of 50–80% by weight talc in said talc-kaolin mixture or 55% by weight of a talc-mica mixture with a proportion of 50–80% by weight talc in said talc-mica mixture, the talc having respectively the following grain distribution:
  a) 98–100% of particles < 20 μm
  b) 25–70% of particles < 2 μm
  c) 12–40% of particles < 1 μm
  d) 0.1–12% of particles < 0.2 μm
in each case of a corresponding spherical diameter.

11. Pigment mixture according to claims 1 or 6, wherein the mixture consists of 50% of weight calcium carbonate or dolomite or mixtures thereof and 50% by weight talc or 50% by weight of a talc-kaolin mixture with a proportion of 50–80% by weight talc in said talc-kaolin mixture or 50% by weight of a talc-mica mixture with a proportion of 50–80% by weight talc in said talc-mica mixture, the talc having respectively the following grain distribution:
 a) 98–100% of particles<20 μm
 b) 25–70% of particles<2 μm
 c) 12–40% of particles<1 μm
 d) 0.1–12% of particles<0.2 μm
in each case of a corresponding spherical diameter.

12. Pigment mixture according to claim 1, wherein the calcium carbonate or the dolomite has the following grain distribution:
 a) 95–100% of particles<10 μm
 b) 70–96% of particles<2 μm
 c) 20–75% of particles<1 μm
 d) 2–17% of particles<0.2 μm
in each case of a corresponding spherical diameter.

13. Pigment mixture according to claim 12, wherein the calcium carbonate or the dolomite has the following grain distribution:
 a) 96–100% of particles<10 μm
 b) 80–94% of particles<2 μm
 c) 35–70% of particles<1 μm
 d) 5–15% of particles<0.2 μm
in each case of a corresponding spherical diameter.

14. Pigment mixture according to claim 12, wherein the calcium carbonate or the dolomite has the following grain distribution:
 a) 97–100% of particles<10 μm
 b) 85–92% of particles<2 μm
 c) 45–65% of particles<1 μm
 d) 7–12% of particles<0.2 μm
in each case of a corresponding spherical diameter.

15. Pigment mixture according to claim 12, wherein the calcium carbonate or the dolomite has the following grain distribution:
 a) 99% of particles<10 μm
 b) 90% of particles<2 μm
 c) 60% of particles<1 μm
 d) 10% of particles<0.2 μm
in each case of a corresponding spherical diameter.

16. Pigment mixture according to claim 1, wherein the mixture consists of:
 50–60% by weight calcium carbonate or dolomite
 20–30% by weight talc and
 20–30% by weight kaolin.

17. Pigment mixture according to claim 16, wherein the mixture consists of:
 50% by weight calcium carbonate or dolomite
 25% by weight talc and
 25% by weight kaolin.

18. Pigment mixture according to claim 1, wherein the mica has the following grain distribution:
 a) 98–100% of particles<20 μm
 b) 25–70% of particles<2 μm
 c) 12–40% of particles<1 μm
 d) 0.1–12% of particles<0.2 μm
in each case of a corresponding spherical diameter.

19. Pigment mixture according to claim 1, wherein the talc has the following grain distribution:
 a) 98–100% of particles<20 μm
 b) 40–58% of particles<2 μm
 c) 20–34% of particles<1 μm
 d) 0.1–5% of particles<0.2 μm
in each case of a corresponding spherical diameter.

20. Pigment mixture according to claim 19, wherein the talc has the following grain distribution:
 a) 98% of particles<20 μm
 b) 50% of particles<2 μm
 c) 25% of particles<1 μm
 d) 2% of particles<0.2 μm
in each case of a corresponding spherical diameter.

21. Pigment mixture according to claim 1, wherein the kaolin has the following grain distribution:
 a) 90–100% of particles<20 μm
 b) 20–93% of particles<2 μm
 c) 10–60% of particles<1 μm
 d) 0.1–10% of particles<0.2 μm
in each case of a corresponding spherical diameter.

22. Pigment mixture according to claim 21, wherein the kaolin has the following grain distribution:
 a) 95–100% of particles<20 μm
 b) 55–85% of particles<2 μm
 c) 30–54% of particles<1 μm
 d) 2–7% of particles<0.2 μm
in each case of a corresponding spherical diameter.

23. Pigment mixture according to claim 21 or 22, wherein the kaolin has the following grain distribution:
 a) 100% of particles<20 μm
 b) 80% of particles<2 μm
 c) 51% of particles<1 μm
 d) 4% of particles<0.2 μm
in each case of a corresponding spherical diameter.

24. Pigment mixture according to claim 2, wherein the specific surface area according to BET of the calcium carbonate or the dolomite lies in the range from 6–15 m$^2$/g.

25. Pigment mixture according to claim 24, wherein the specific surface area according to BET of the calcium carbonate or the dolomite lies in the range from 8–12 m$^2$/g.

26. Pigment mixture according to claim 25, wherein the specific surface area according to BET of the calcium carbonate or the dolomite lies in the range is 10 m$^2$/g.

27. Pigment mixture according to claim 3, wherein the specific surface area according to BET of the talc or kaolin or mica lies in the range from 7–15 m$^2$/g.

28. Pigment mixture according to claim 27, wherein the specific surface area according to BET of the talc or kaolin or mica lies in the range from 10–13 m$^2$/g.

29. Pigment mixture according to claim 28, wherein the specific surface area according to BET of the talc or kaolin or mica is 12 m$^2$/g.

30. Pigment mixture according to claim 1, wherein the mixture additionally contains 0.5–1.5% by weight wetting agent with respect to the content of talc or talc-kaolin mixture or talc-mica mixture.

31. Pigment mixture according to claim 1, wherein the mixture additionally contains 0.1–0.3% by weight dispersing agent with respect to the content of talc or talc-kaoline mixture or talc-mica mixture.

32. Pigment mixture according to claim 1 or 2 wherein the calcium carbonate is a natural calcium carbonate.

33. Pigment mixture according to claim 1 or 2 wherein the calcium carbonate is a precipitated calcium carbonate.

34. Pigment mixture according to claim 1 or 2 wherein the calcium carbonate is chalk, marble or limestone.

* * * * *